(12) United States Patent
Tobata et al.

(10) Patent No.: US 9,050,917 B2
(45) Date of Patent: Jun. 9, 2015

(54) INCLINABLE HEADREST

(71) Applicants: Hideo Tobata, Akishima (JP); Takayuki Yoshiga, Akishima (JP); Yutaka Sodeno, Akishima (JP)

(72) Inventors: Hideo Tobata, Akishima (JP); Takayuki Yoshiga, Akishima (JP); Yutaka Sodeno, Akishima (JP)

(73) Assignee: TACHI-S CO., LTD. (JP)

( * ) Notice: Subject to any disclaimer, the term of this patent is extended or adjusted under 35 U.S.C. 154(b) by 180 days.

(21) Appl. No.: 13/753,134

(22) Filed: Jan. 29, 2013

(65) Prior Publication Data

US 2014/0210244 A1     Jul. 31, 2014

(30) Foreign Application Priority Data

Jan. 31, 2012 (JP) ................................. 2012-017652

(51) Int. Cl.
  *B60N 2/48* (2006.01)
(52) U.S. Cl.
  CPC .................................. *B60N 2/4841* (2013.01)
(58) Field of Classification Search
  CPC ...................... B60R 2021/0048; B60R 2/4847
  USPC ..................... 297/408, 411.3, 411.32, 411.38
  See application file for complete search history.

(56) References Cited

U.S. PATENT DOCUMENTS 4,978,171 A * 12/1990 Tateyama .................. 297/411.38
8,641,149 B2 * 2/2014 Little ............................ 297/408

FOREIGN PATENT DOCUMENTS

| JP | 8-224139 | 9/1996 |
| JP | 2000-225036 | 8/2000 |
| JP | 2012-162123 | 8/2012 |

\* cited by examiner

*Primary Examiner* — David R. Dunn
*Assistant Examiner* — Jody Giacoman
(74) *Attorney, Agent, or Firm* — Ostrolenk Faber LLP

(57) ABSTRACT

An inclinable headrest includes a base bracket including first and second side walls, a ratchet gear, and a lock gear movable for engagement with the ratchet gear. Both ratchet and lock gears are disposed inwardly of the first and second side walls. The lock gear has a connecting hole. The first side wall of the base bracket has an opening defined at a location where the connecting hole of the lock gear exists, and a connecting region defined near to that opening. Provision of those opening and connecting regions allows direct and quick connection by a worker's hand of a tension spring between the lock gear and base bracket from the outside, such that the worker can directly engage one end of the tension spring with the lock gear's connecting hole through the opening, while directly engaging the other end thereof with the base bracket's connecting region.

7 Claims, 3 Drawing Sheets

INCLINABLE HEADREST

BACKGROUND OF THE INVENTION

1. Field of the Invention

The present invention relates to a headrest of inclinable type for use with an automotive seat, which is adjustingly inclinable in the forward and backward directions of the seat to adjust an angle of inclination of the headrest for supporting a head of an occupant on the seat. In particular, the invention is directed to a headrest of this kind provided with a ratchet-type inclination adjustment mechanism wherein a lock gear is normally biased by a spring element into meshed engagement with a ratchet gear to maintain a certain inclination angle of the headrest, but, disengagement and engagement of the lock gear from and with the ratchet gear permits adjustable inclination of the headrest at a desired angle for supporting the seat occupant's head.

2. Description of Prior Art

Among various sorts of headrests, there is known an inclinable headrest having a ratchet-type inclination adjustment mechanism provided therein for adjustment of inclination of the headrest. For example, FIG. 1 shows a conventional ratchet-type inclination adjustment mechanism (RM') to be provided in a headrest, which basically comprises: a base bracket 10'; a ratchet gear 3; a lock gear 2; and a tension spring 1'. It is to be noted that such conventional ratchet-type inclination adjustment mechanism RM' is well known in the art.

The base bracket 10' is of a substantially U-shaped cross-section having: a vertically extending base wall 10'B; and a pair of first and second side walls 10'A and 10'C projecting continuously from two lateral ends of that base wall 10'B, respectively, as seen in FIG. 1.

Reference is now made to FIG. 2. Although this FIG. 2 shows a structure of the present invention which will be elaborated later, it is to be understood that most of the constituent elements forming a headrest HR as well as a ratchet-type inclination adjustment mechanism RM, which are shown in FIG. 2, are known in the art, excepting a base bracket 10, a tension spring mounting area (at 10AR and 11) and a tension spring 1, which are associated with the present invention. Hence, hereinafter, the conventional ratchet-type inclination adjustment mechanism (RM') will be described, using some of the known constituent elements shown in FIG. 2, for the sake of clarity.

Designation 5 in FIG. 2 denotes a known headrest stay by which the headrest HR is mounted on the top of a seat back SB, the headrest stay 5 having a horizontal upper base portion 50. As understandable from FIGS. 1 and 2, rotatably connected to such horizontal upper base portion 50 of headrest stay 5 are the two lower end portions respectively of the aforesaid two first and second side walls 10'A and 10'C of the base bracket 10'.

As shown in FIG. 1, a lock gear 2 and a ratchet gear 3 are provided inside of the three walls 10'A, 10'B and 10'C of the base bracket 10'. The ratchet gear 3 is fixedly attached to the aforesaid headrest stay's horizontal upper base portion 50, whereas the lock gear 2 is rotatably journalled between the first and second side walls 10'A and 10'B of base bracket 10. The toothed region 21' of the lock gear 2 is in meshed engagement with the gear region 30 of the ratchet gear 3. A biasing coil spring 4 is wound about the horizontal upper base portion 50 of headrest stay 5, such that one end 41 thereof is connected with the ratchet gear 3, while the other end 42 thereof is engaged in a hole 10'Ch of the base bracket 10'.

While not shown in FIG. 1, the base wall 10'B of base bracket 10' is fixed to a known suitable conventional frame element securely provided within the headrest HR, on the understanding that this conventional ratchet-type inclination adjustment mechanism RM' is applied only to the body of the headrest HR.

As constructed above, the base bracket 10' is free to rotate about the headrest stay's horizontal upper base portion 50, but biasingly caused by the tension coil spring 4 to rotate in a direction rearwardly of the body of the headrest HR. Therefore, the headrest body itself is biased by that biasing coil spring 4 in a rearward direction at R relative to the headrest stay 5. But, the meshed engagement of the lock gear 2 with the ratchet gear 3 locks the base bracket 10' or the headrest body (HR) against rotation, so that the headrest body is normally locked and retained at a certain angle of inclination relative to the headrest stay 5.

With vertical rotation of the lock gear 2, the toothed region 20 of the lock gear 2 can be meshed with and disengaged from the toothed region 30 of the ratchet gear 3, to thereby allow locking and unlocking of the base bracket 10' or the headrest body (HR) at a desired angle of inclination.

According to such conventional ratchet-type inclination adjustment mechanism RM', a tension spring 1' is shown in FIG. 1 to be provided between the lock gear 2 and the base bracket's first side wall 10'A, so that the lock gear 2 is normally biased by the tension spring 1' into meshed engagement with the stationary lock gear 3. Specifically, the tension spring 1' is at one end portion VA thereof engaged in a hole 10'Ah formed in the base bracket's first side wall 10'A and is also at the other end portion 1'B thereof engaged in a hole 21' formed in the lock gear 2, such that a main body of the tension spring 1' is interposed between an inner surface 10'A-1 of the base bracket's side wall 10'A and one lateral surface 2W of the lock gear 2.

In this regard, the process of assembling the inclination adjustment mechanism RM' involves a manual step for a worker to use his or her hands to insert the tension spring 1' in a space between the base bracket's inner surface 10'A-1 and the lock gear's lateral surface 2W, and then engage the two end portions 1A and 1B thereof in the two holes 10'Ah and 21', respectively.

However, such space between the two surfaces 10'A and 2W mentioned above is quite narrow, which makes it troublesome and time-consuming for the worker to install and secure the tension spring 1' between the lock gear 2 and base bracket's first side wall 10'A as described above. To solve such problem, it may be possible to widen the space between the side wall 10'A and lock gear 2, which will however require increasing the size of the base bracket 10' and thus makes it impossible to design the base bracket in a small size. Even if the base bracket 10' can be formed in a smaller size, it is still quite troublesome and time-consuming for the worker to manually bring the tension spring 1' into a narrow space between the base bracket's first side wall 10'A and the lock gear 2, and manage to engage the two ends 1'A and 1'B of that tension spring 1' in the respective two holes 10'Ah and 21' as stated above.

In any case, in this prior art shown in FIG. 1, the location for installation of the tension spring 1' is at the inside of the base bracket 10' and at a hardly accessible narrow point between the base bracket's inner surface 10'A-1 and the lock gear 2. Moreover, the end 1'B of the tension spring 1' has to be bent as shown, after having been inserted in the hole 21' of the lock gear 2, for preventing the removal thereof from that hole 21'. As a consequence thereof, it is extremely difficult for the worker to quickly connect the tension spring 1' between the base bracket 10' and the lock gear 2.

SUMMARY OF THE INVENTION

In view of the above-stated drawbacks, it is a purpose of the present invention to provide an improved inclinable headrest which not only enables a worker to use his or her hand to easily and quickly connect a tension spring between a base bracket and a lock gear, but also allows the base bracket to be made small in size and weight.

In order to achieve such purpose, an inclinable headrest in accordance with the present invention is basically comprised of:
- a body of the headrest;
- a headrest stay having a base portion disposed within the body of the headrest, and a pillar portion extending from the base portion and projecting outwardly from the body of the headrest;
- a ratchet-type inclination adjustment mechanism provided within the body of the headrest, the ratchet-type inclination adjustment mechanism being operable for adjustment of forward and rearward inclination of the headrest, and including:
  - a base bracket so formed in a substantially "U" shape in cross-section to have a base wall connected with the body of the headrest, and a pair of first and second side walls extending from the base wall, such that the base wall and the pair of first and second side walls define an inner space in the base bracket,
  - the base bracket being rotatably connected with the base portion of the headrest stay;
  - a ratchet gear fixed to the base portion of the headrest stay so as to be disposed in the inner space of the base bracket;
  - a lock gear arranged in the inner space of the base bracket so as to be movable for engagement and disengagement with and from the ratchet gear;
  - such first side wall of the base bracket having: an inner surface facing to the lock gear; and an outer surface facing outwardly of the base bracket;
- a tension spring element adapted for normally biasing the lock gear into engagement with the ratchet gear, the tension spring element including a first connecting portion and a second connecting portion;
- a connecting hole formed in the lock gear, the connecting hole being of such a size that allows the first connecting portion of the tension spring to be inserted therein and hookingly connected therewith;
- an opening defined in the first side wall of the base bracket at a point where the first connecting hole of the lock gear exists, the opening being of such a large size that allows a whole of the connecting hole of the lock gear to be exposed and accessed therethrough and also covers a range in which the connecting hole is to be vertically moved with the vertical rotation of the lock gear; and
- a connecting region formed in the first side wall of the base bracket at a point near to the opening, the connecting region being so configured to allow the second connecting portion of the tension spring to be inserted therein and hookingly connected therewith;
- wherein the tension spring is attached on the outer surface of the first side wall of the base bracket, such that the first connecting portion thereof is hookingly connected with the connecting hole of the lock gear through the opening, while the second connecting portion thereof is hookingly connected with the connecting region defined in the first side wall of the base bracket.

Accordingly, provision of the opening and the connecting region near thereto in the first side wall of base bracket allows both connecting hole of the lock gear and connecting region to be directly accessed by a worker from the outside, so that the worker can readily engage the first and second connecting portions of the tension spring with those connecting holes and connecting region, respectively, to thereby quickly connect the tension spring between the base bracket and the lock gear. Further, the lock gear can be arranged in the base bracket such that one lateral surface thereof is disposed as close as possible to an inner surface of the first side wall of the base racket, or slidably contacted therewith, thereby allowing the base bracket to be made small in size and weight.

As one aspect of the present invention, in the first side wall of the base bracket, an outwardly protrudent region may be defined right below the opening so as to protrude outwardly of the base bracket, whereupon an outward recession is defined in an inward surface of the outwardly protrudent region, the inward surface facing to the inner space of the base bracket where the lock gear lies. And also, the connecting region may be defined in such outwardly protrudent region near to the opening, so that the second connecting portion of the tension spring, engaged in that connecting region, is accommodated within the afore-said outward recession to thereby avoid the projection thereof into the inner space of the base bracket.

As another aspect of the invention, the tension spring element may include: a body portion; a first connecting region bent from the body portion to extend in one direction; a first anchor end region integral with the first connecting region; a second connecting region bent from the body portion to extend in a same direction with the afore-said one direction in which the first connecting region extends; a second anchor end region bent from the second connecting region, the second anchor end region extending in a direction opposite to a direction in which the first anchor end region extends. The connecting hole of the lock gear may be of such a size that allows both the first connecting region and first anchor end region of the tension spring to be inserted therein, while allowing the first anchor end region to be hookingly engaged therewith. Also, the connecting region be so configured to allow both the second connecting region and second anchor end region of the tension spring to be inserted therein, while allowing the second anchor end region to be hookingly engaged therewith;

Other various features and advantages will become apparent from reading of the description, hereinafter, with reference to the accompanied drawings.

DETAILED DESCRIPTION OF PREFERRED EMBODIMENT OF THE INVENTION

Reference being now made to FIGS. 2 to 6, there is illustrated a preferred mode of inclinable headrest HR in accordance with the present invention, the inclinable headrest HR having a ratchet-type inclination adjustment mechanism RM provided therein for allowing adjustment of forward and rearward inclination of the headrest HR.

As stated in the foregoing description of prior art, the ratchet-type inclination adjustment mechanism RM employed in the present invention is basically similar in structure and action to the previously described conventional ratchet-type inclination adjustment mechanism RM'. But, as will become apparent, several remarkable improvements are provided to such known sort of ratchet-type inclination adjustment mechanism in accordance with the present invention.

A specific description will therefore be made of novel aspects of headrest HR in accordance with the present invention.

Hereinafter, note that the wording, "forward", "front" or "forwardly", refers to a forward side F that faces forwardly of the headrest HR, whereas the wording "rearward", "rear" or "rearwardly" refers to a rearward side R that faces rearwardly of the headrest HR.

Figure 1:
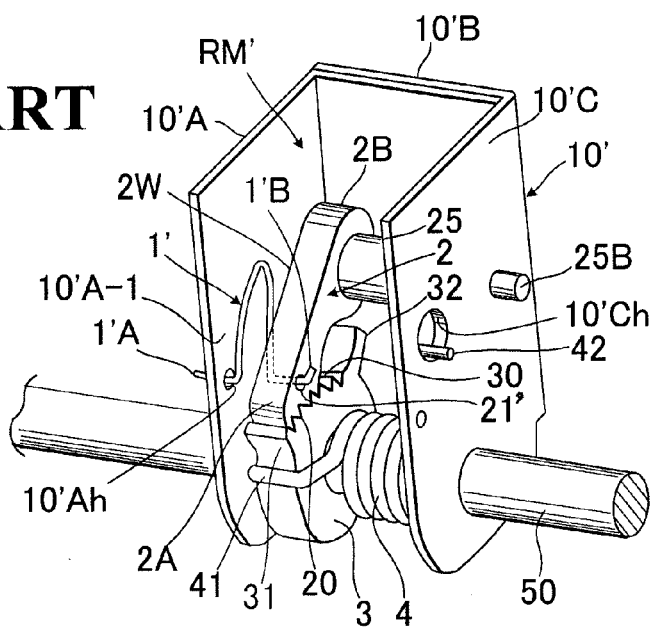
FIG. 1 is a schematic perspective view broken in part, which shows a conventional ratchet-type inclination adjustment mechanism to be provided in an inclinable headrest.
Figure 2:
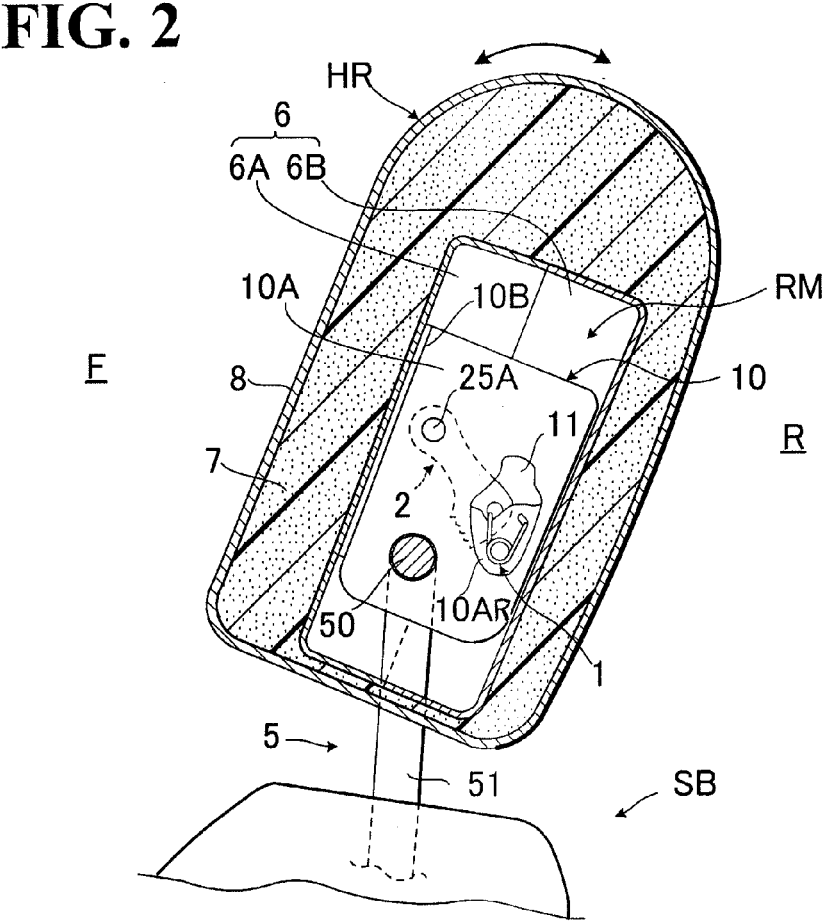
FIG. 2 is a sectional view showing an inclinable headrest and a ratchet-type inclination adjustment mechanism provided therein in accordance with the present invention.
Figure 5:
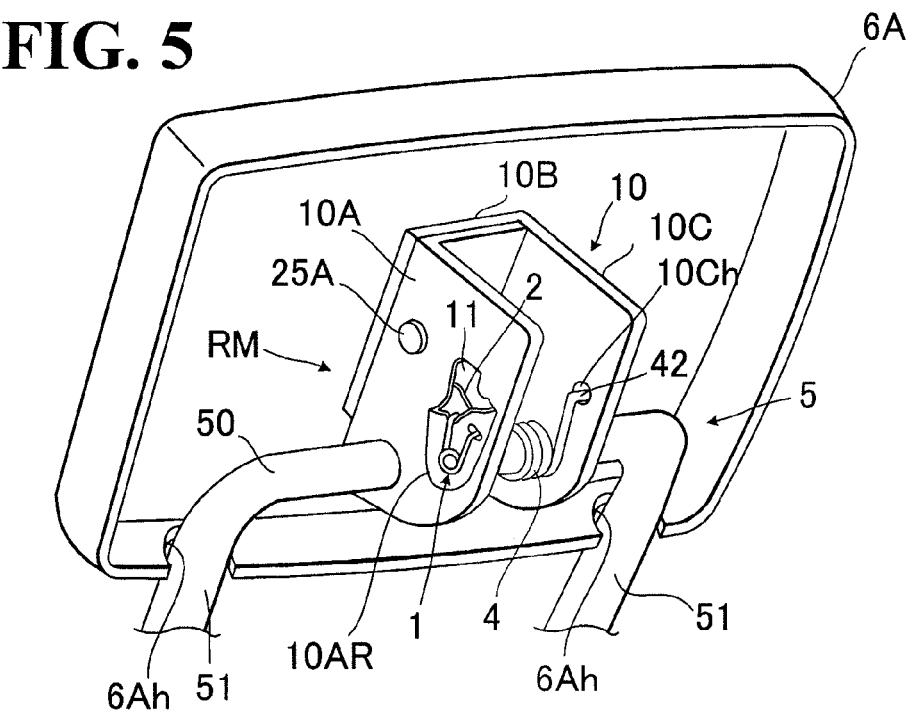
FIG. 5 is a partly exploded perspective view showing a state where the ratchet-type inclination adjustment mechanism is attached to one half of a frame element and rotatably connected with a headrest stay of the headrest.

With first reference to FIG. 2, the headrest HR is rotatably connected with a known headrest stay 5 via the ratchet-type adjustment inclination mechanism RM so as to be adjustingly inclinable forwardly and rearwardly of the seat back SB. As best seen in FIG. 5, the headrest stay 5 has: a horizontal upper base portion 50; and a pair of pillar portions 51 and 51 extending downwardly from that horizontal upper base portion 50. Those two pillar portions 51 and 51 are fixedly mounted in the top of the seat back SB.

Figure 6:
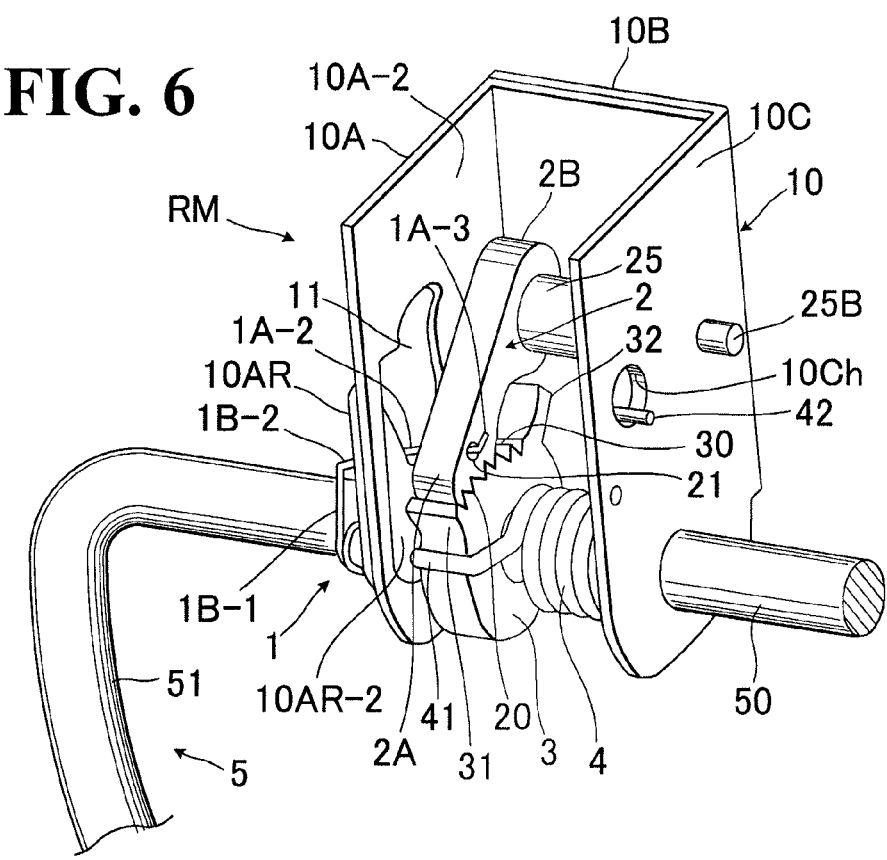
FIG. 6 is a schematic perspective view broken in part, which shows the ratchet-type inclination adjustment mechanism of the present invention.

As best shown in FIG. 6, the ratchet-type adjustment inclination mechanism RM includes a ratchet gear 3 and a lock gear 2, as known in the art. The ratchet gear 3 having a toothed region 30 is fixedly attached to the horizontal upper base portion 50 of the headrest stay 5. The lock gear 2 has a base end portion 2B fixed to a shaft 25 and a free end portion 2A in which a toothed region 20 is defined. The toothed region 20 of the lock gear 2 may be meshed with a selected partial toothed area in the toothed region 30 of the ratchet gear 3, the details of which will be set forth later.

In accordance with the present invention, a novel configuration and arrangement of base bracket 10, tension spring 1 and a lock gear 2 are provided in the foregoing known basic structure of a ratchet-type adjustment inclination mechanism. The base bracket 10 is of a substantially channel or U-shaped cross-section having: a vertically extending base wall 10B; and a pair of first and second side walls 10A and 10C projecting continuously from two lateral ends of that base wall 10B, respectively. The pair of first and second side walls 10A and 10C are, at the respective lower end portions thereof, rotatably connected to the horizontal upper base portion 50 of headrest stay 5, so that the base bracket 10 itself is free to rotate about that horizontal upper base portion 50.

Naturally, the base bracket 10 has an inner space defined among the three walls 10A, 10B and 10C thereof. As shown in FIG. 6, provided in that inner space of base bracket 10 are the aforesaid ratchet gear 3 and lock gear 2, such that the ratchet gear 3 is attached fast to the headrest stay's horizontal base or upper portion 50, with the toothed region 30 thereof facing upwards to a side where the lock gear 2 lies, whereas on the other hand, the lock gear 2 is at the base end portion 2B thereof fixed to a shaft 25 and has the toothed region 20 defined in the free end portion 2A, the toothed region 20 being normally meshed with the toothed region 30 of the lock gear 3. Designation 31 and 32 denote first and second stopper portions, respectively, which are formed on the opposite sides of the toothed region 30 in the ratchet gear 3 and adapted for limiting forward and rearward movement ranges of the lock gear 2, as known in the art.

As seen in FIGS. 5 and 6, the shaft 25 has first and second ends 25A and 25B which are rotatably secured in the first and second side wall 10A and 10C, respectively. Hence, the lock gear 2 is rotatable vertically relative to the shaft 25, so that the toothed region 20 thereof may be meshed with and disengaged from the toothed region 30 of the ratchet gear 3, as known in the art. Designation 4 denotes a known biasing coil spring, which is wound about the horizontal upper base portion 50 of the headrest stay 5 and adapted for biasing the base bracket 2 in a direction rearwardly of the headrest HR. Namely, one end 41 of that biasing coil spring 4 is attached to the ratchet gear 3, while the other end 42 thereof is attached in a hole 10Ch of the base bracket 10.

With the above-described known basic construction, the lock gear 2 is normally meshed with the ratchet gear 3, and, upon being rotated upwardly, the lock gear 2 is brought out of meshed engagement with that gear element 3. Under such unlocked state, the base bracket 10 can be rotated forwardly and rearwardly relative to the headrest stay's upper base portion 50, against a biasing force of the biasing coil spring 4. As shown in FIGS. 2 and 5, the base wall 10B of the base bracket 10 is fixedly attached to a front frame portion 6A forming one half of a frame element 6, and a whole of the base bracket 10 as well as upper localized portions of the headrest stay's two pillar portions 51 are accommodated in and between the front and rear frame portions 6A and 6B which form one frame element 6. As shown in FIG. 5, the front frame portion 6A is formed at the lower flange portion thereof with a pair of slits 6Ah and 6Ah, through which the two headrest stay's pillar portions 51 and 51 pass, respectively. The same goes for the rear frame portion 6B, though not shown. This formation of slits 6Ah allows forward and rearward rotation of the frame element 6 as well as of the base bracket 10 attached thereto in relation to the headrest stay 5. Further, substantially an entirety of such frame element 6 is covered with an upholstery comprising a trim cover assembly 8 and a foam padding 7, thereby forming a body of the headrest HR, as shown in FIG. 2.

In accordance with the present invention, a tension spring mounting area (at 10AR and 11) is defined in the first side wall 10A of the base bracket 10, a relatively large connecting hole 21 is formed in the free end portion 2A of the lock gear 2, and a tension spring 1 is provided, which is so configured to permit its engagement with such tension spring mounting area and connecting hole 21.

Figure 3:
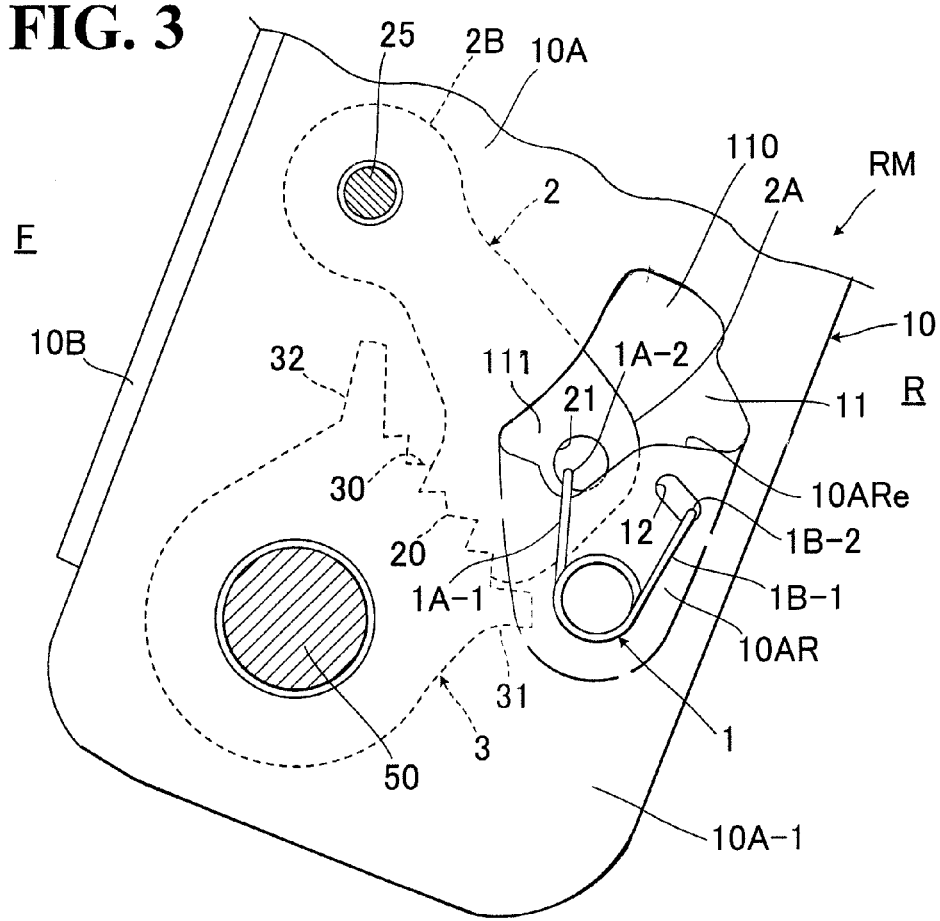
FIG. 3 is a front view showing a principal part of the present invention.
Figure 4:
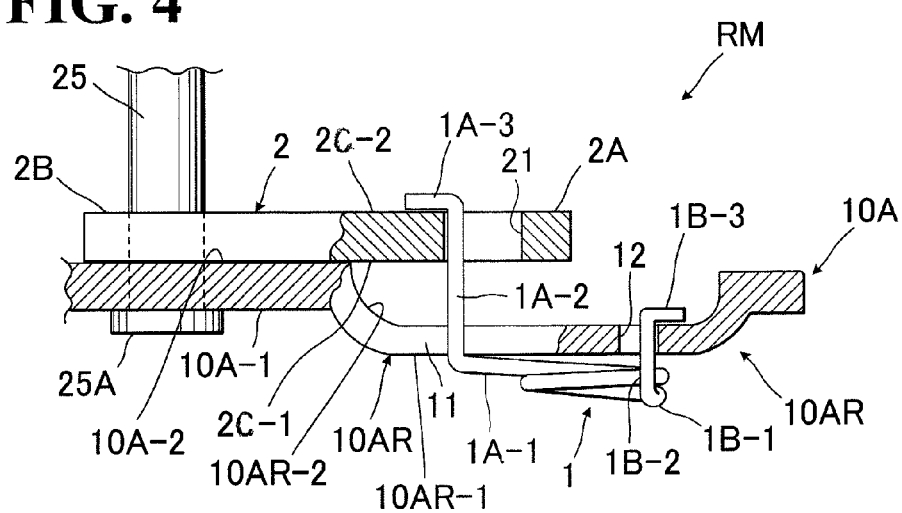
FIG. 4 is a fragmentary sectional view showing the principal part of the present invention.

Specifically, the tension spring 1 is of a spiral spring type, as illustrated, but may be of any other suited shape, insofar as it can be mounted to the tension spring mounting area. As seen in FIG. 3, essentially, the tension spring 1 has a first arm portion 1A-1 and a second arm portion 1B-1, both of which extend in a same direction from the spiral body portion of the tension spring 1 so as to diverge from each other. Hence, a whole of the tension spring 1 takes on the form of substantially a "V". Further, as best seen in FIG. 4, the tension spring 1 is provided with the following unique regions:

a) a first bent connecting region 1A-2 extending at a right angle from the first arm portion 1A-1 so as to project outwardly of the tension spring 1; and a first anchor end region 1A-3 extending from that first bent connecting region 1A-2 so as to project laterally of the tension spring 1; and b) a second bent connecting region 1B-2 extending at a right angle from the second arm portion 1B-1 so as to project outwardly of the tension spring 1 in parallel with the aforesaid first bent connecting region 1A-2; and a second anchor end region 1B-3 extending from that second bent connecting region 1B-2 so as to project laterally of the tension spring 1 in a direction opposite to the aforesaid first anchor end region 1A-3.

It is noted here that the first bent connecting region 1A-2 is larger in length than the second bent connecting region 1B-2.

In the first side wall 10A of base bracket 10, there is defined the aforementioned tension spring mounting area at a location where the free end portion 2A and connecting hole 21 of the lock gear 2 exist, as can be best seen in FIG. 3, the tension spring mounting area being basically formed by:

a) an outwardly protrudent wall region 10AR defined by stamping or pressing a corresponding localized region of the first side wall 10A so as to protrude outwardly from that first side wall 10A; and b) an opening region 11 defined by cutting out a localized region of the first side wall 10A so as to be situated right above the outwardly protrudent region 10AR.

As shown in FIGS. 3 and 4, the outwardly protrudent region 10AR includes an outer surface 10AR-1 of such a shape and dimension that allows substantially an entirety of the tension spring 1 to be attached thereon. Also, formed in outer surface 10AR-1 is an elongated connecting hole 12 adapted for allowing connection therein of the second arm portion 1B-1 of the tension spring 1, the details of which will be described later. The elongated connecting hole 12 is shown to be inclined downwardly as it proceeds to a rearward side (at R) of the base bracket 10.

In this context, a diameter of the previously stated connecting hole 21 of the lock gear 2 is larger than a length of the first anchor end region 1A-3 of the tension spring 1, thereby allowing direct insertion of the first anchor end region 1A-3 in the connecting hole 21. Also, the length and width of the aforesaid elongated connecting hole 12 are larger than the length and cross-sectional area of the second anchor end region 1B-3 of the tension spring 1, respectively, so that such second anchor end region 1B-3 can be directly inserted in the elongated connecting hole 12.

Designation 10ARe denotes an edge of the outwardly protrudent region 10AR, which adjoins with the opening region 11. The edge 10ARe as depicted in FIG. 4 is offset outwardly from and parallel with a plane on which both opening region 11 and first side wall 10A extend. As such, it is observed in the FIG. 4 that the planar wall of the outwardly protrudent region 10AR is recessed outwardly from that plane on which the opening region 11 and first side wall 10A extend, thereby defining an outward recession in the inner side of the outwardly protrudent region 10AR, which in turn provides a space between the first lateral surface 2C-1 of the lock gear 2 and the inner surface 10AR-2 of the outwardly protrudent region 10AR.

The second anchor end region 1B-3 of the tension spring 1 is engaged in the elongated connecting hole 12 defined in the above-described planar wall of the outwardly protrudent region 10AR. Therefore, the second anchor end region 1B-3 is situated outwardly of the first side wall 10A and distant from the first lateral surface 2C-1 of the lock gear 2.

Looking further at FIG. 3, the opening region 11 is formed in a substantially sector shape so as to define therein: a divergently widened first space 110; and a second space 111 smaller than the first space 110. Basically, this opening region 11 is formed to extend in conformity with a locus or path along which the connecting hole 21 of the lock gear 2 is to be displaced vertically relative to the shaft 25 with vertical rotation of the lock gear 2 relative to that shaft 25. Thus, with reference to such path, both first and second spaces 110 and 111 are defined in the opening region 11 in the illustrated fashion. As shown, through the second space 111, the connecting hole 21 of the lock gear 2 is exposed and accessible from the outside.

The tension spring 1 is attached upon the outer surface 10AR-1 of the outwardly protrudent region 10AR, with the first and second anchor end regions 1A-3 and 1B-3 thereof being hookingly connected with the connecting hole 21 of the lock gear 2 and the elongated connecting hole 12 of the outwardly protrudent region 10AR, respectively. It is to be noted that, under an unused state of the tension spring 1 prior to such connection, a distance between the first and second bent connecting regions 1A-2 and 1B-2 thereof is greater than a distance between the two connecting holes 21 and 12. This is naturally required, because, upon engagement of the tension spring 1 with those two connecting holes 21 and 12, a repulsive resilient force must be created in each of the first and second arm portions 1A-1 and 1B-1 of the tension spring 1, sufficient to bias the lock gear 2 into meshed engagement with the ratchet gear 3.

As constructed above, the base bracket 10 is free to rotate about the headrest stay's upper horizontal base portion 50, but biasingly caused by the biasing spring 4 to rotate in a direction rearwardly of the body of the headrest HR. Therefore, the headrest body itself is biased by that biasing spring 4 in a rearward direction (at R) relative to the headrest stay 5. But, the meshed engagement of the lock gear's toothed region 20 with the ratchet gear's toothed region 30 locks the base bracket 10 or the body of the headrest HR against rotation, so that the headrest body is normally retained and locked at a certain angle of inclination relative to the headrest stay 5. When the lock gear 2 is rotated upwardly against the biasing force of the tension spring 1, the toothed region 20 thereof is disengaged from the toothed region 30 of ratchet gear 3, thereby releasing the base bracket 10 or the headrest HR from the locked state and enabling a user to adjustingly incline the headrest HR at a desired angle in the forward and rearward directions.

Now, a specific description will be made as to how the tension spring 1 is securely connected between the lock gear 2 and the base bracket 10.

Prior to the tension spring 1 being attached to the above-defined tension spring mounting area (at 10AR and 11), by way of one example, a worker may use his or her two fingers to hold the spiral body portion of the tension spring 1, with both first and second arm portions 1A-1 and 1B-1 thereof projecting upside, and then point the first anchor end region 1A-3 of the tension spring 1 at the lock gear's connecting hole 21, while pointing the second anchor end region 1B-3 thereof at the first space 110 of the opening region 11.

The worker should first insert and pass the tension spring's first anchor end region 1A-3 in and through the lock gear's connecting hole 21 via the second space 111 of the opening region 11, so that the tension spring's first bent connecting region 1A-2 is inserted in that connecting hole 21. At that moment, both second anchor end region 1B-3 and second bent end connecting region 1B-2 of the tension spring 1 enter the widened space 110 automatically. Then, the worker has to simply displace the tension spring 1 leftwise or forwardly as viewed from FIG. 3, towards the side where the lock gear 2 exists, with the result that, as seen in FIG. 4, the first anchor end region 1A-3 is hookingly engaged on the inwardly-facing second lateral surface 2C-2 of the lock gear 2, while the first bent connecting region 1A-2 is contacted and connected with a localized edge region (or a left-side local edge region as viewed from FIGS. 3 and 4) of the connecting hole 21. Thus, the tension spring 1 is connected with the lock gear 2, while being rested on the edge 10ARe of the outwardly protruded region 10AR, and as such, the worker has to temporarily release his or her two fingers from the tension spring 1. Subsequently, the worker should use his or her two fingers to hold and warp the second arm portion 1B-1 of the tension spring 1 resiliently away from the first space 110 with respect to the thus-connected first anchor end region 1A-3, so that the second arm portion 1B-1 itself is resiliently bent outwardly of the base bracket 10. At this point, both second anchor end region 1B-3 and second bent connecting region 1B-2 are positioned exteriorly of the outwardly protrudent region 10AR, and then the worker should insert such two regions 1B-3 and 1B-2 into the elongated connecting hole 12.

Thereafter, upon the tension spring 1 being released from the worker's fingers, under the resilient recovery of the second arm portion 1B-1, the second bent connecting region 1B-2 is biasingly contacted and connected with one downwardly facing edge (or the right-side edge as viewed from FIG. 3) of the elongated connecting hole 12, whereas the second anchor end region 1B-3 thereof is hookingly engaged on the inner surface 10AR-2 of the outwardly protrudent region 10AR, as seen in FIG. 4. In this regard, the elongated connecting hole 12 is inclined downwardly as previously stated, which prevents sliding movement therealong of the tension spring's second bent connecting region 1B-2, even when the tension spring's first arm portion 1A-1 is moved vertically with vertical rotation of the lock gear 2, thereby avoiding removal of the second anchor end region 1B-3 from the elongated connecting hole 12.

In that way, the worker can easily and quickly connect the tension spring 1 between the lock gear 2 and the base bracket 10 with his or her one hand, and therefore a downward biasing force is applied to the first end portion 2A of the lock gear 2 to thereby normally maintain the toothed region 20 of the lock gear 2 in a meshed engagement with the toothed region 30 of the ratchet gear 3.

Of course, instead of the above-described tension spring mounting steps, prior to the mounting of tension spring 1, the worker may wish to firstly hold and warp the first and second arm portions 1A-1 and 1B-1 of the tension spring 1 resiliently towards each other, using his or her two fingers, so as to shorten a distance therebetween substantially in correspondence with a distance between the lock gear's connecting hole 21 and the elongated connecting hole 12, and then adjust the distance between those two arm portions 1A-1 and 1B-1 with his or her two fingers to cause initial insertion of both first anchor end region 1A-3 and first bent connecting region 1A-2 in the lock gear's connecting hole 21, while causing subsequent insertion of both second anchor end region 1B-3 and second bent connecting region 1B-2 in the elongated connecting hole 12, in a continued sequential way. Thereafter, upon the tension spring 1 being released from the worker's fingers, under the resilient recovery of both first and second arm portions 1A-1 and 1B-1 thereof, the tension spring's first and second anchor end regions 1A-3 and 1B-3 are automatically moved away from each other and hookingly engaged on the second lateral surface 2C-2 of the lock gear 2 and the inner surface 10AR-2 of the outwardly protrudent region 10AR, respectively. In that very simple way, the worker can directly connect the tension spring 1 between the lock gear 2 and the base bracket 10, with much ease and rapidity, in comparison with the previously described steps.

It is to be noted that the tension spring 1 as well as an entirety of the ratchet-type inclination adjustment mechanism RM are disposed within the frame element 6, and therefore, the tension spring 1 is protected by the frame element 6 from contact with external objects including the foam padding 7.

From the descriptions above, in accordance with the present invention, it is to be appreciated that the following effects and advantages are achieved:

(i) Provision of the opening region 11 and outwardly protruded region 10AR in the first side wall 10A of base bracket 10 allows both lock gear's connecting hole 21 and elongated connecting hole 12 to be directly accessed by a worker from the outside. Thus, the worker can simply hold the tension spring 1 with his or her one hand and directly connect the two anchor end regions 1A-3 and 1B-3 of the tension spring 1 with those two connecting holes 21 and 12, respectively, thereby realizing a rapid assembly of the inclination adjustment mechanism RM and the headrest HR.

(ii) With regard to the opening region 11, the second space 111 defined therein surrounds a whole of the connecting hole 21 of the lock gear 2, thereby making the connecting hole 21 per se clearly visible and readily accessible therethrough from the outside. Thus, the worker can quickly and directly insert the first anchor end region 1A-3 of the tension spring 1 in that connecting hole 21. On the other hand, the first space 110 defined in the opening region 11 becomes divergent upwardly as it proceeds from the first space 111 toward the upper side of the base bracket's side wall 10A. This widened configuration of first space 110 allows direct and easy entry therein of both second anchor end region 1B-3 and second bent connecting region 1B-2 of the tension spring 1. By virtue thereof, at an initial step, the worker can quickly insert the first anchor end region 1A-3 of the tension spring 1 in the connecting hole 21, while allowing direct entry of those the second anchor end regions region 1B-3 and the second bent connecting region 1B-2 in the first space 110 at the same time, without necessity for bending any of the first and second arm portions 1A-1 and 1B-1 of the tension spring 1 at this initial step. Of course, such initial step is followed by the next step of bending the second arm portion 1B-1 resiliently and inserting both second anchor and connecting regions 1B-3 and 1B-2 in the elongated connecting hole 12, as previously described.

(iii) As best understandable from FIG. 4, the planar wall of the outwardly protrudent region 10AR is recessed outwardly from a plane on which the base bracket's first side wall 10A extends, thereby providing an outward recession between that side wall 10A and the inner surface 10AR-2 of the outwardly protruded region 10AR. In such planar wall of the outwardly protrudent region 11, the elongated connecting hole 12 is formed, in which the second anchor end region 1B-3 of the tension spring 1 is hookingly connected. Thus, as shown in FIG. 4, such particular second anchor end region 1B-3 is accommodated within the outward recession defined in the inward surface 10AR-2 of the outwardly protrudent region 10AR so as not to project into the inner space of the base bracket 10 in which the lock gear 2 exists. Accordingly, even if the free end portion 2A of the lock gear 2 is formed long enough to reach or extend over a point where the second anchor end region 1B-3 lies, there will be no contact and interference of that second anchor end region 1B-3 with the lock gear's free end portion 2A.

(iv) Because of no contact of the tension spring's second anchor end region 1B-3 with the lock gear 2 as stated in the item (iii) above, and because of substantially an entire body of the tension spring 1 being disposed exteriorly of the base bracket's first side wall 10A, the lock gear 2 can be arranged in the base bracket 10 as close as possible to the inner surface 10A-2 of the base bracket's first side wall 10A, or it is even possible to dispose the outwardly facing lateral surface 2C-1 of the lock gear 2 in a slidable contact with that base bracket's inner surface 10A-2, as seen in FIG. 4. Hence, it is possible to reduce a distance between the first and second side walls 10A and 10C of the base bracket 10, thereby allowing a whole of the base bracket 10 to be made small in size and weight. This in turn allows reduction of the entire size and thickness of the frame element 6, so that a thickness of the foam padding 3 can be increased for improvement of comfortable support touch of the headrest HR.

While having described the present invention thus far, it is to be understood that the invention is not limited to the illustrated embodiment, but any modification, addition and replacement may be applied thereto, without departing from the scopes of the appended claims.

What is claimed is:

1. A headrest of inclinable type, comprising:
   a body of the headrest;
   a headrest stay having a base portion disposed within said body of the headrest, and a pillar portion extending from said base portion and projecting outwardly from said body of the headrest;
   a ratchet-type inclination adjustment mechanism provided within said body of the headrest, said ratchet-type inclination adjustment mechanism being operable for adjustment of forward and rearward inclination of the headrest, and including:
   a base bracket so formed in a substantially "U" shape in cross-section to have a base wall connected with said body of the headrest, and a pair of first and second side walls extending from said base wall, such that said base wall and said pair of first and second side walls define an inner space in said base bracket,
   said base bracket being rotatably connected with said base portion of said headrest stay;
   a ratchet gear fixed to said base portion of said headrest stay so as to be disposed in said inner space of said base bracket;
   a lock gear arranged in said inner space of said base bracket so as to be movable for engagement and disengagement with and from said ratchet gear;
   said first side wall of said base bracket having: an inner surface facing said lock gear; and an outer surface facing outwardly of said base bracket;
   a tension spring element adapted for normally biasing said lock gear into engagement with said ratchet gear, said tension spring element including a first connecting portion and a second connecting portion;
   a connecting hole formed in said lock gear, said connecting hole being of such a size that allows said first connecting portion of said tension spring to be inserted therein and hookingly connected therewith;
   an opening defined in said first side wall of said base bracket at a point where said first connecting hole of said lock gear exists, said opening being of such a large size that allows a whole of said connecting hole of said lock gear to be exposed and accessed therethrough, covers a range in which said connecting hole is to be vertically moved with a vertical rotation of said lock gear, and allows said second connecting portion of said tension spring to be located in said opening while said first connecting portion of said tension spring is inserted in said opening and hookingly connected in said opening to said lock gear; and
   a connecting region formed in said first side wall of said base bracket at a point near to said opening, said connecting region being so configured to allow said second connecting portion of said tension spring to be inserted therein and hookingly connected therewith;
   wherein said tension spring is attached on said outer surface of said first side wall of said base bracket, such that the first connecting portion thereof is hookingly connected with said connecting hole of said lock gear through said opening, while the second connecting portion thereof is hookingly connected with said connecting region defined in said first side wall of said base bracket.

2. The headrest of inclinable type as claimed in claim 1, which further comprises a frame element provided within said body of the headrest, wherein said tension spring and said ratchet-type inclination mechanism are accommodated in said frame element, and wherein said base wall of said base bracket is firmly attached to said frame element.

3. A headrest of inclinable type, comprising:
   a body of the headrest;
   a headrest stay having a base portion disposed within said body of the headrest, and a pillar portion extending from said base portion and projecting outwardly from said body of the headrest;
   a ratchet-type inclination adjustment mechanism provided within said body of the headrest, said ratchet-type inclination adjustment mechanism being operable for adjustment of forward and rearward inclination of the headrest, and including:
   a base bracket so formed in a substantially "U" shape in cross-section to have a base wall connected with said body of the headrest, and a pair of first and second side walls extending from said base wall, such that said base wall and said pair of first and second side walls define an inner space in said base bracket,
   said base bracket being rotatably connected with said base portion of said headrest stay;
   a ratchet gear fixed to said base portion of said headrest stay so as to be disposed in said inner space of said base bracket;
   a lock gear arranged in said inner space of said base bracket so as to be movable for engagement and disengagement with and from said ratchet gear;
   said first side wall of said base bracket having: an inner surface facing said lock gear; and
   an outer surface facing outwardly of said base bracket;
   a tension spring element adapted for normally biasing said lock gear into engagement with said ratchet gear, said tension spring element including a first connecting portion and a second connecting portion;
   a connecting hole formed in said lock gear, said connecting hole being of such a size that allows said first connecting portion of said tension spring to be inserted therein and hookingly connected therewith;
   an opening defined in said first side wall of said base bracket at a point where said first connecting hole of said lock gear exists, said opening being of such a large size that allows a whole of said connecting hole of said lock gear to be exposed and accessed therethrough and also covers a range in which said connecting hole is to be vertically moved with a vertical rotation of said lock gear; and a connecting region formed in said first side wall of said base bracket at a point near to said opening, said connecting region being so configured to allow said second connecting portion of said tension spring to be inserted therein and hookingly connected therewith;

wherein said tension spring is attached on said outer surface of said first side wall of said base bracket, such that the first connecting portion thereof is hookingly connected with said connecting hole of said lock gear through said opening, while the second connecting portion thereof is hookingly connected with said connecting region defined in said first side wall of said base bracket, and wherein, in said first side wall of said base bracket, an outwardly protrudent region is defined right below said opening so as to protrude outwardly of the base bracket, whereupon an outward recession is provided in an inward surface of said outwardly protrudent region, said inward surface facing said inner space of said base bracket where said lock gear lies, and wherein said connecting region is defined in said outwardly protrudent region near to said opening, so that said second connecting portion of said tension spring, engaged in said connecting region, is accommodated within said outward recession to thereby avoid the projection thereof into said inner space of said base bracket.

4. A headrest of inclinable type, comprising:

a body of the headrest;

a headrest stay having a base portion disposed within said body of the headrest, and a pillar portion extending from said base portion and projecting outwardly from said body of the headrest;

a ratchet-type inclination adjustment mechanism provided within said body of the headrest, said ratchet-type inclination adjustment mechanism being operable for adjustment of forward and rearward inclination of the headrest, and including:

a base bracket so formed in a substantially "U" shape in cross-section to have a base wall connected with said body of the headrest, and a pair of first and second side walls extending from said base wall, such that said base wall and said pair of first and second side walls define an inner space in said base bracket, said base bracket being rotatably connected with said base portion of said headrest stay;

a ratchet gear fixed to said base portion of said headrest stay so as to be disposed in said inner space of said base bracket;

a lock gear disposed in said inner space of said base bracket so as to be movable for engagement and disengagement with and from said ratchet gear;

said first side wall of said base bracket having: an inner surface facing said lock gear; and an outer surface facing outwardly of said base bracket;

a tension spring element adapted for normally biasing said lock gear into engagement with said ratchet gear, said tension spring element including: a body portion; a first connecting region bent from said body portion to extend in one direction; a first anchor end region integral with said first connecting region; a second connecting region bent from said body portion to extend in a same direction with said one direction in which said first connecting region extends; a second anchor end region integral with said second connecting region, said second anchor end region extending in a direction opposite to a direction in which said first anchor end region extends;

a connecting hole formed in said lock gear, said connecting hole being of such a size that allows both said first connecting region and first anchor end region of said tension spring to be inserted therein, while allowing said first anchor end region to be hookingly connected therewith;

an opening defined in said first side wall of said base bracket at a point where said first connecting hole of said lock gear exists, said opening being of such a large size that allows a whole of said connecting hole of said lock gear to be exposed and accessed therethrough and also covers a range in which said connecting hole is to be vertically moved with said a vertical rotation of said lock gear; and a connecting region formed in said first side wall of said base bracket at a point near to said opening, said connecting region being so configured to allow both said second connecting region and second anchor end region of said tension spring to be inserted therein, while allowing said second anchor end region to be hookingly connected therewith;

wherein said body portion of said tension spring is disposed on said outer surface of said first side wall of said base bracket, such that said first anchor end region of said tension spring is hookingly connected with said connecting hole of said lock gear through said opening, with said first connecting region thereof passing through said opening and said connecting hole, and said second anchor end region of said tension spring is hookingly connected with said connecting region defined in said first side wall of said base bracket, with said second connecting region thereof passing through said connecting region.

5. The headrest of inclinable type according to claim 4, wherein said connecting region comprises an elongated connecting hole formed at a slant in said first side of said base bracket near to said opening.

6. The headrest of inclinable type according to claim 4, wherein said tension spring is of a spiral type, and wherein said body portion of the tension spring is a spiral body portion.

7. The headrest of inclinable type according to claim 4, which further comprises a frame element provided within said body of the headrest, wherein said tension spring and said ratchet-type inclination mechanism are accommodated in said frame element, and wherein said base wall of said base bracket is firmly attached to said frame element.

* * * * *